United States Patent
Goldstein et al.

(10) Patent No.: US 12,127,569 B2
(45) Date of Patent: Oct. 29, 2024

(54) SOLUBLE TAPIOCA FLOUR COMPOSITIONS

(71) Applicant: Cargill, Incorporated, Wayzata, MN (US)

(72) Inventors: Avi Goldstein, Golden Valley, MN (US); Xian-Zhong Han, Maple Grove, MN (US); Thomas Kennedy Hutton, Minneapolis, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 17/757,858

(22) PCT Filed: Dec. 22, 2020

(86) PCT No.: PCT/US2020/066604
§ 371 (c)(1),
(2) Date: Jun. 22, 2022

(87) PCT Pub. No.: WO2021/133799
PCT Pub. Date: Jul. 1, 2021

(65) Prior Publication Data
US 2023/0023166 A1      Jan. 26, 2023

Related U.S. Application Data

(60) Provisional application No. 62/952,938, filed on Dec. 23, 2019.

(51) Int. Cl.
*A23L 19/10*        (2016.01)

(52) U.S. Cl.
CPC .................................. *A23L 19/11* (2016.08)

(58) Field of Classification Search
CPC .. A23V 2250/5118; A23L 27/60; A23L 19/11; A23L 19/10; A23L 19/01
See application file for complete search history.

(56) References Cited

U.S. PATENT DOCUMENTS 2,987,424 A * 6/1961 Olnick ................... C08B 30/04
                                                                                127/65
5,350,593 A     9/1994 Lacourse
(Continued)

FOREIGN PATENT DOCUMENTS

CN     104621510 A    5/2015
CN     105177088 A    12/2015
(Continued)

OTHER PUBLICATIONS

Onodu, Bonaventure C., Richard J Culas and Ezekiel U Nwose, Facts about dietary fibre in cassava: Implicaion for diabetes' medical nutrition therapy, Intregative Food, Nutrition and Metabolism, vol. 5(3): 1-5, 2018. (Year: 2018).*
(Continued)

*Primary Examiner* — Hong T Yoo

(57) ABSTRACT

Described herein are soluble tapioca flour compositions having desirable chemical properties and solubility and viscosity functionality for use in food products such as, beverage mix, infant food, a medicinal product, an emulsion, convenience foods, or a snack-based filling. Such compositions can be used as a partial or complete replacement of maltodextrin and offer a more clean-label alternative.

11 Claims, 3 Drawing Sheets

(56) References Cited

U.S. PATENT DOCUMENTS

| | | |
|---|---|---|
| 2012/0003356 A1 | 1/2012 | Ekanayake |
| 2014/0193564 A1 | 7/2014 | Carder |
| 2021/0112833 A1* | 4/2021 | Goldstein ............... C12P 19/14 |
| 2022/0000155 A1 | 1/2022 | Goldstein |

FOREIGN PATENT DOCUMENTS

| | | | |
|---|---|---|---|
| CN | 105341802 A | 2/2016 | |
| CN | 105431047 A | 3/2016 | |
| CN | 107814880 A | 3/2018 | |
| CN | 109957035 A | 7/2019 | |
| WO | WO-2004007739 A1 * | 1/2004 | ............. C12P 19/02 |
| WO | 2017173324 A2 | 10/2017 | |
| WO | 2020006030 W | 1/2020 | |
| WO | 2020092730 W | 5/2020 | |

OTHER PUBLICATIONS

Collazos Hernadnez Gilberto, WO2004/007739 A1, English Machine Translation, Abstract, Jan. 2004. (Year: 2004).*

* cited by examiner

SOLUBLE TAPIOCA FLOUR COMPOSITIONS

CROSS REFERENCE TO RELATED APPLICATIONS

This application is a national phase application of PCT/US2020/066604, filed 22 Dec. 2020, entitled SOLUBLE TAPIOCA FLOUR COMPOSITIONS which claims the benefit of U.S. Provisional Patent Application No. 162/952,938, filed 23 Dec. 2019, entitled SOLUBLE TAPIOCA FLOUR COMPOSITIONS which are hereby incorporated by reference in their entirety.

TECHNICAL FIELD

This application relates to soluble flour compositions and methods of manufacturing the same.

BACKGROUND

Consumers are asking for label friendly alternatives to maltodextrin in food and beverage applications. While there is a desire to create label-friendly alternatives, there is also a desire for such alternatives to have similar functionality as that of maltodextrin.

SUMMARY

Described herein are soluble tapioca flour compositions having desirable chemical properties and solubility and viscosity functionality for use in food products such as, beverage mix, infant food, a medicinal product, an emulsion, convenience foods, or a snack-based filling. Such compositions can be used as a partial or complete replacement of maltodextrin and offer a more clean-label alternative.

FIGURES

Figure 1:
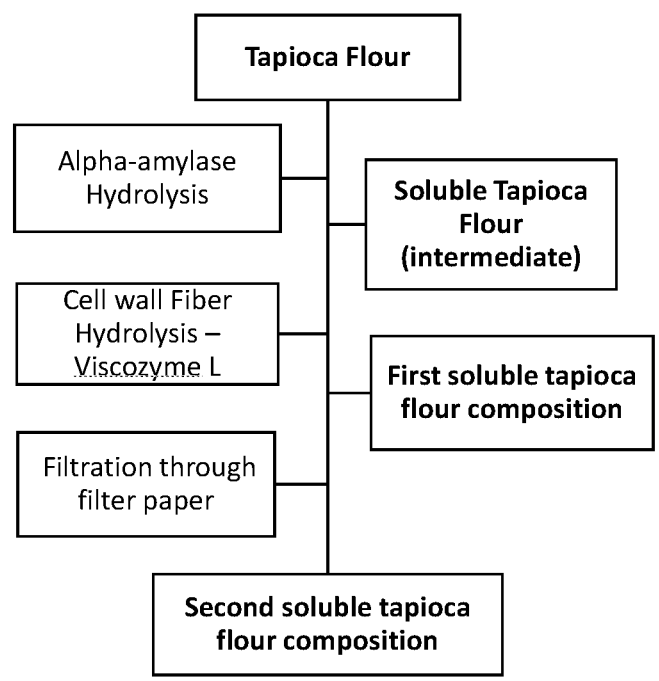

FIG. 1 provides an illustration of the manufacturing process to achieve the soluble tapioca flour compositions described herein.

Figure 2:
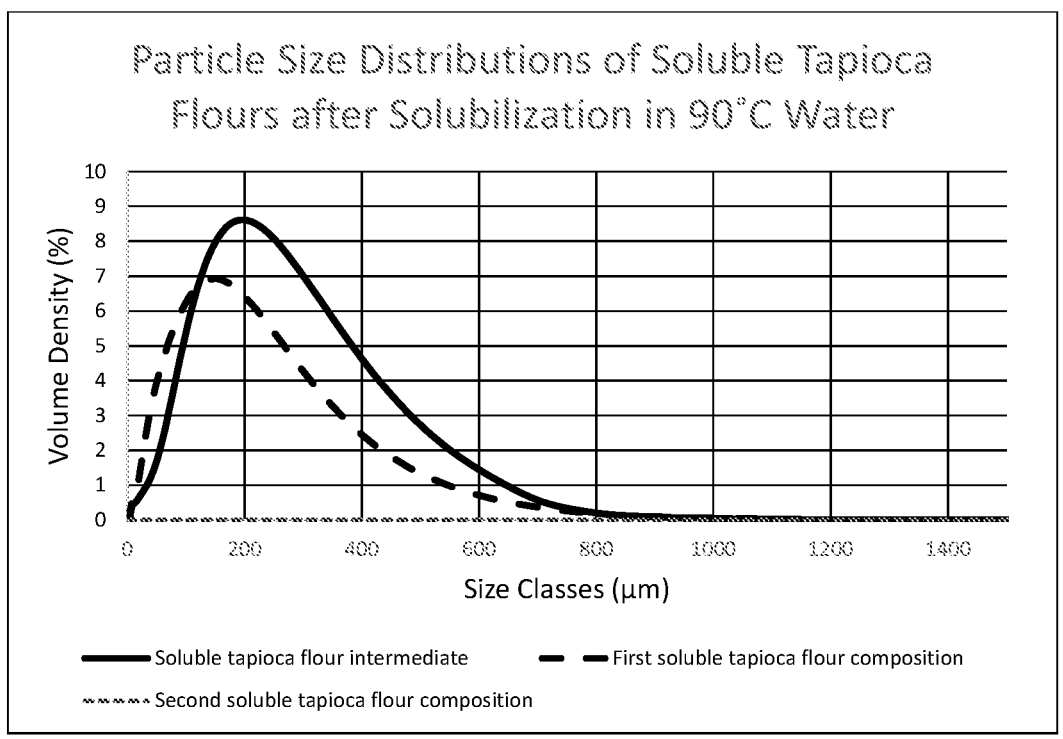

FIG. 2 shows the particle size distribution of the soluble tapioca flour compositions described herein.

Figure 3:
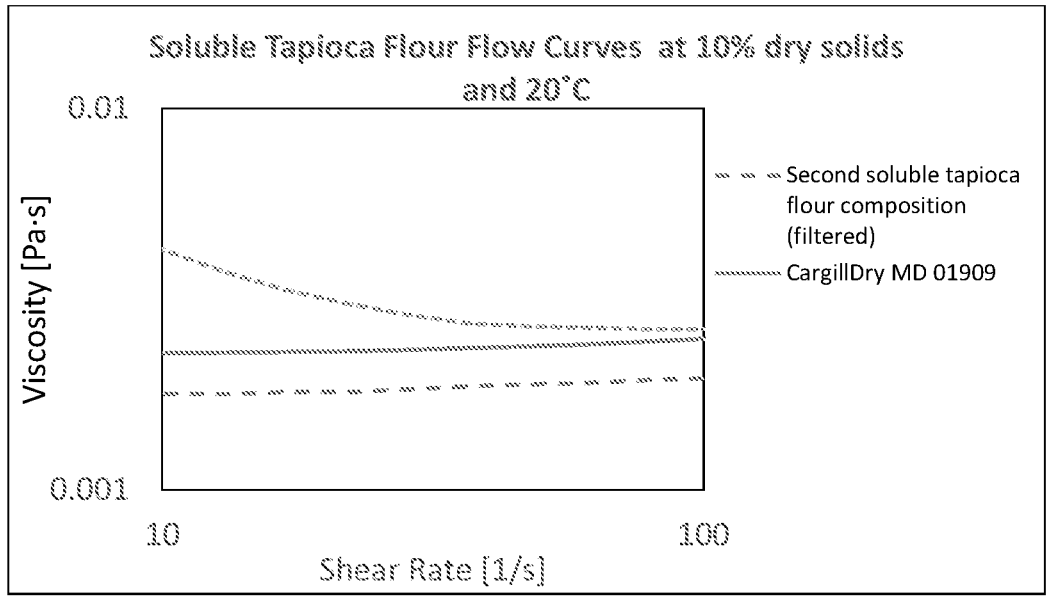
Figure 4:
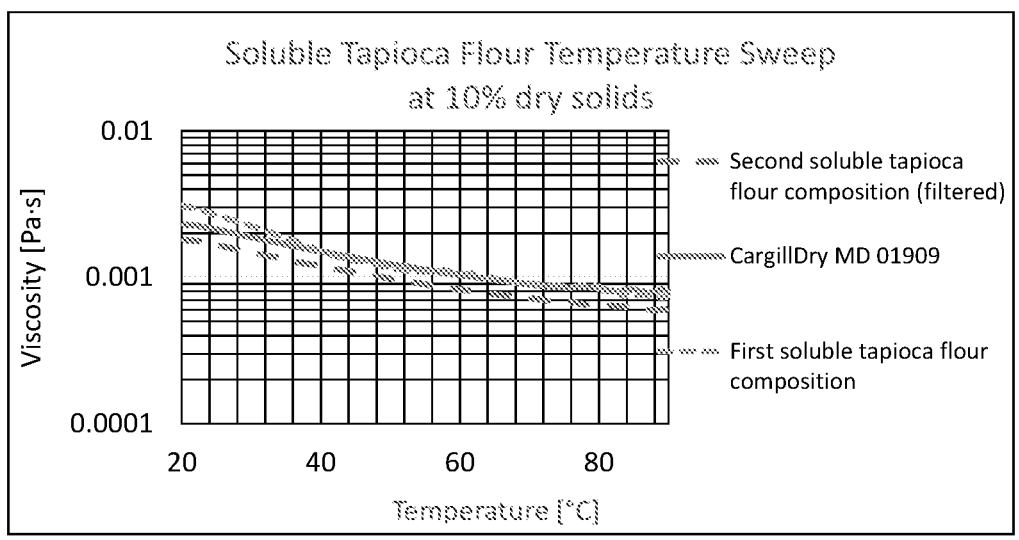

FIGS. 3 and 4 provide viscosity curves of the soluble tapioca flour compositions at a given shear rate and temperature, respectively, compared to maltodextrin.

DETAILED DESCRIPTION

Described herein is a soluble tapioca flour composition and a method of manufacturing the same. Such soluble tapioca flour compositions can be used in food and beverage applications as a maltodextrin replacement. It shall be understood that tapioca flour may also be referred to herein as cassava flour, and that such difference in terms is based on geographical and market differences. Cassava flour sold commercially typically contains fiber contents (both soluble and insoluble fiber) in the range of 2.0-10 grams fiber per 100 grams of flour, whereas tapioca flour sold commercially may be more refined, and may contain lower amounts of fiber than the previously mentioned cassava flour. In this application, reference to cassava or tapioca flour refers to milled flours containing greater than 2 grams of fiber per 100 grams flour. As used herein, the term "soluble tapioca flour" can be referred to as hydrolyzed, enzymatically treated, enzymatically-modified, and/or solubilized tapioca flour.

The skilled person knows how to manufacture a soluble tapioca flour, e.g. from U.S. Pat. No. 5,350,593 and US20186268997, the disclosures of which are incorporated herein by reference.

Such soluble tapioca flour has been treated to promote greater solubility of their principle components in liquids such as water. Further, such soluble flour demonstrates similar functionality as that of maltodextrin, has a desirable "clean flavor", mouthfeel, and texture suitable for food and beverage applications. As used herein, the term "soluble" is referencing solubility of flour components in water. As used herein, the term "flour" encompasses (1) non-grain flours and (2) fractionated, non-whole grain flours wherein a portion of bran and germ have been removed.

Described herein are soluble tapioca flour compositions created by treating native tapioca flour with an enzyme to obtain a soluble tapioca flour intermediate. The enzyme is preferably an alpha-amylase enzyme, however other bacterial or fungal enzymes may also be used, for example but not limited to iso-, gluco-, beta-, pullulanase, and/or alpha enzymes, and/or combinations thereof. In preferred aspects, the alpha-amylase is a thermal stable alpha-amylase. Subsequently, the soluble tapioca flour intermediate is treated with a second enzyme designed to hydrolyze cell wall material, for example but not limited to pectinase, beta glucanase, xylanase, and cellulase. This second-enzyme treated soluble tapioca flour composition is referred to herein as the "first soluble tapioca flour composition". The first soluble tapioca flour composition optionally can be subsequently filtered to create a filtered soluble tapioca flour composition referred to herein as the "second soluble tapioca flour composition". Collectively, both first and second soluble tapioca flour compositions are referred to herein as the "soluble tapioca flour compositions". FIG. 1 provides an illustration of the manufacturing process to achieve the soluble tapioca flour compositions described herein.

Compositionally, the soluble tapioca flour compositions described herein comprise a carbohydrate content ranging from 90 to 98 wt % and more preferably from 92 to 97 wt %. The protein content of the soluble tapioca flour compositions ranges from 0.5 to 1.5 wt %, preferably between 0.75 and 1.3 wt %, more preferably between 0.9 and 1.1 wt % and more preferably around 1 wt %. The fat content is less than 1 wt % and the insoluble fiber content ranges from 0.5 to 3.5 wt % and more preferably 0.5 to 1 wt %.

The dextrose equivalent ("DE") of the soluble tapioca flour compositions described herein range 5 to 18 and more preferably 8 to 15. Such compositions are distinguishable from native flour and have significantly improved solubility and viscosity functionality for certain food applications.

The soluble tapioca flour compositions described herein are substantially soluble and have improved solubility over native tapioca flour starting material. Without being bound by any theory, it is believed that the enzyme treatments and optional subsequent filtration further improves solubility.

Solubility is measured by particle size distribution and based on the wet/dispersed solubility in 90 C water. The soluble tapioca flour compositions comprise a particle size distribution wherein 90% of particles have a size of 350 microns or less. The soluble tapioca flour compositions comprise a particle size distribution wherein 50% of particles have a particle size of 150 microns or less. Further, the soluble tapioca flour compositions comprise a particle size distribution wherein 10% of particles have a size of 40 microns or less. In some aspects, the filtered, second soluble tapioca flour composition is nearly completely soluble in water wherein 100% of particles have a size of less than 1 micron, more preferably less than 0.5 microns, and even more preferably less than 0.1 microns.

Preferably, the soluble tapioca flour composition of the invention, comprises a particle size distribution wherein 90% of particles have a size of 350 microns or less and 50% of particles have a particle size of 150 microns or less. Preferably, 10% of particles have a size of 40 microns or less. Preferably, said composition contains a particle size distribution wherein 100% of particles have a size of less than 1 micron, preferably less than 0.5 microns. Preferably, the composition is substantially soluble in water.

Furthermore, the soluble tapioca flour compositions have desirable viscosity functionality. The soluble tapioca flour compositions have a viscosity ranging from 1 to 10 cP at 20 C and 10% dry solids and more preferably ranging from 2 to 5 cP at 20 C and 10% dry solids (at a shear rate of 10 [1/s]).

The soluble tapioca flour composition as described herein is desirable for use in food applications. Notable food applications include but are not limited to beverages, beverage mixes, infant food, medicinal products, food emulsions, convenience foods, bakery, dairy, salad dressings, and snack-based fillings or food products (including frozen meals). Beverages and beverage mixes can include instant mixes for hot or cold beverages, flavored milk including chocolate milk, carbonated soft drinks, fruit juices, sports beverages, nutrition beverages, and infant formula. Dairy can include ice cream, yogurt, sour cream, whip cream, and non-dairy vegan alternatives. Convenience foods include but are not limited to salad dressings (pourable and spoonable), sauces (instant and prepared), condiments, puddings, bars, cereals, coatings for cereal, spreads, low-fat spreads, icings, hard candies, soft candies, gummy products, and dry mix seasonings. Bakery can include cookies, cakes, muffins, crackers, pastries, and laminated baked products.

The soluble tapioca flour composition as described herein can be used as at least a partial replacement of maltodextrin in food applications and in many cases can be used as a full replacement of maltodextrin in food applications. Such soluble flour can be an effective maltodextrin replacement in any food application in which maltodextrins are currently used. The soluble tapioca flour demonstrates similar functionality (e.g., pH, solubility, and viscosity) as maltodextrin making it a suitable replacement for maltodextrin in food applications. Such replacement allows for consumer-friendly labelling as soluble flours may be more well received by some consumers as compared to maltodextrin.

Further, such soluble tapioca flour additionally has the capability to replace maltodextrins in flavor encapsulation applications wherein a flavor emulsion is created and spray dried, to convert a liquid flavor into a solid. In these applications maltodextrins may be used alongside a lipophilic starch, or alternately used alone to create a flavor emulsion. Maltodextrins are typically used in this space due to their ability to form matrices that positively contribute to encapsulation. The soluble tapioca flour described herein can replace maltodextrins in this space due to their bland flavor, low viscosity, and low cost. Additionally, soluble tapioca flours can replace maltodextrin in plating oil-based flavors.

In preferred aspects, the soluble tapioca flour as described herein can be used for instant sauces (e.g., dry mix that is reconstituted to a sauce formed by the consumer), prepared sauces, dry mix seasoning, and flavor encapsulation. Such soluble tapioca flours can be added in varying amounts and consistently demonstrate similar taste and functionality as maltodextrin.

EXAMPLES

Example #1: Method of Making Soluble Tapioca Flour

In a mixing tank, a 25% (w/w) aqueous flour slurry was prepared using King Lion cassava flour (King Lion Premium Cassava flour, American Key Food Products LLC, NJ, USA). A quantity of 24 kg water was added in the mixing tank first, and then the mixing was started at slow speed to prevent splashing. 8 kg as-is tapioca flour was added slowly to the mixing tank while contents were mixed continuously at a slow speed. The slurry was maintained at ambient temperature. The speed of mixing was adjusted to prevent settling of flour solids.

The pH and the temperature of the slurry in feed tank were adjusted to pH to 4.8-5.2 using 7% HCl and about 22° C. After pH adjustment, the mixing of the slurry continued at a gentle speed. A required quantity of 6.8 g GC 127 (0.085% flour wt. basis) enzyme (thermostable alpha-amylase enzyme, DuPont) was weighted in a clean plastic container and enzyme was added into the slurry.

Using water as the feed for the jet cooker, the jet cooker was equilibrated at a cooking temperature between 270° F. (132° C.) and an outlet temperature of 203° F. (95° C.) (atmospheric flash in product tank). Once the cooking conditions were set, the feeding of the tapioca flour slurry into the jet cooker commenced. The liquefact product exiting the jet cooker was collected into a product tank which was equipped with an overhead mixer and temperature controlled up to 95° C. After the first jet-cooking, it was preferred to pass the jet cooked slurry through the jet cooker a second time, followed by an addition of 2 g (0.025% flour wt. basis) GC 127 enzyme dosing.

The liquefact was held in the product tank at 95° C. for a desired holding time (~30 min to 1 hour), while continuously mixing the liquefacts at a slow speed to avoid splashing of hot liquid. After completion of desired holding times, the pH was adjusted to 2.7-3.0 at 95° C. and the liquefact was held at the set pH for 15 minutes. The mixing the liquefacts continued at a slow speed to avoid splashing of hot liquid. To ensure complete inactivation of enzyme, the temperature was accurately controlled and the holding time was set to 15 minutes.

the heating was turned off by adjusting the steam valve and the slurry cooled down to 80° C. (use cooling water circulation if needed). The mixing of liquefacts continued at a slow speed to avoid splashing of hot liquid. The pH was adjusted to 4.45 in liquefacts using NaOH base buffer. The liquefacts could be spray-dried for making soluble tapioca flour intermediate.

To make the first soluble tapioca flour compositions, 12 kg liquefacts was transferred directly to the Groen cooker. Once pH was between 4.45 and temperature at 48-53° C., 49.9 g Viscozyme L (optimal pH range of 3.3-5.5 and a temperature of 25-55° C., Novozymes Inc.) was added to the slurry and the enzymatic reaction was carried out for 60 minutes. The slurry was heated to 85° C. for 15 minutes to kill the Viscozyme L. Said soluble tapioca flour composition can then be spray-dried to obtain the first tapioca flour composition.

In some instances, prior to spray-drying, the first tapioca flour composition was filtered using Buchner vacuum filtration (Whatman filter paper grade 4 or VWR filter paper 417 pore 35-45μ) to obtain a second soluble tapioca flour composition that was filtered. Such filtration can then be followed by spray-draying.

FIG. 1 provides a general illustration of this process. Table 1 provides the chemical composition of the first and second tapioca flour compositions compared to standard tapioca flour.

Example #2: Solubility and Particle Size Distribution

The soluble tapioca flour compositions described herein are desirable for use in food products, because they demonstrate good solubility functionality. Particle size distribution analysis was carried out using a Malvern Mastersizer 3000 Laser Light Diffraction Particle Size Analyzer. The particle size of material is determined by laser diffraction, which measures particle size distributions determined by angular variation in intensity of light scattered as a laser beam passes through a dispersed particulate sample. This dispersed particulate sample is a slurry in water. Dx (10), (50) and (90) means 10%, 50% and 90% of the population lies below the diameters of D10, D50 and D90 respectively. D[4,3] is volume weighted mean. In sample preparation, 10 ml of 1% solution of maltodextrin or soluble flour was prepared. Sample was added to the Hydro LV cell dropwise until the obscuration reached at least 1% to start measurement. If the 1% 10 ml solution was added and the obscuration was still less than 1%, the particle sizes were considered to be zero.

Table 2 and FIG. 2 shows the particle size distribution of the soluble tapioca intermediate material and the first and second soluble tapioca flour compositions described herein. Notably, both first and second soluble tapioca flour compositions demonstrate good solubility indicative of the particle size distribution, however the filtering of the second soluble tapioca flour composition enhances such solubility having nearly complete solubility indicative of a general particle size distribution of 0 microns.

TABLE 1

Particle Size Distributions of Soluble Tapioca Flours after Solubilization in 90° C. Water

| Sample Name | Dx (10) (μm) | Dx (50) (μm) | Dx (90) (μm) | D [4, 3] (μm) | Mode (μm) |
| --- | --- | --- | --- | --- | --- |
| Soluble tapioca flour intermediate | 50 | 172 | 390 | 201 | 196 |
| First soluble tapioca flour composition | 29 | 115 | 312 | 149 | 148 |
| Second soluble tapioca flour composition (filtered) | 0 | 0 | 0 | 0 | 0 |

Example #3: Viscosity

The soluble tapioca flour compositions described herein are desirable for use in food products because they demonstrate good viscosity functionality as well. FIGS. 3 and 4 provide viscosity curves at a given shear rate and temperature, respectively, compared to maltodextrin. FIG. 3 provides viscosity profiles of the various samples when measured at 20° C. at shear rates between 10-100 [1/s]. At a shear rate of 10 [1/s], the first soluble flour composition has a viscosity of 4.3 centipoise (cP) and the second soluble flour composition has a viscosity of 1.8 cP compared to a maltodextrin viscosity of 2.3 cP. FIG. 4 provides that at 25° C., the first soluble flour composition has a viscosity of 2.7 cP and the second soluble flour composition has a viscosity of 1.7 cP, compared to maltodextrin having a viscosity of 2.1 cP, when measured at a shear rate of 20/s.

Example #5: Salad Dressing Sensory Analysis

Water was combined with the dry ingredients containing Cargill Dry MD 01909 or the first or second soluble tapioca flour compositions (a one to one replacement of maltodextrin) and mixed in a Cuisinart food processor for approximately 3 minutes—see Table 3 for the formulation. The oil was slowly added to the mixer and mixed for approximately 5 minutes. Vinegar was then added and mixed for approximately 1 minute.

TABLE 2

Control (Reduced Fat, 17.5% Oil)

| INGREDIENT | % | GRAMS |
| --- | --- | --- |
| Water | 48.98 | 146.94 |
| Vegetable Oil | 17.5 | 52.5 |
| Cargill Dry MD 01909 (10 DE) | 16.7 | 50.1 |
| Vinegar | 7 | 21 |
| Sugar | 3 | 9 |
| Salt | 1.7 | 5.1 |
| Egg Yolk Powder | 1.5 | 4.5 |
| HiForm Starch 12754 | 2.8 | 8.4 |
| Ground Mustard | 0.5 | 1.5 |
| Potassium Sorbate | 0.12 | 0.36 |
| Xanthan gum | 0.2 | 0.6 |
| Total | 100 | 300 |

Bostwick measurements were then measured and described in Table 4. Measurements were completed utilizing Bostwick Consistometer (CSC Scientific Company, Inc., Fairfax, Virginia, USA) with a sample loading weight of 100 grams, and a measurement window of 15 seconds. Viscosity was also measured using a Brookfield Rheometer fitted with spindle 64 measured at 20 rpm. Bostwick and viscosity data demonstrates that the soluble tapioca compositions described herein can be suitable replacements for maltodextrin.

TABLE 3

| Dressing Viscosities | Initial Brookfield, Spindle 64, 20 RPM (cp) | 24 hours after initial production Brookfield, Spindle 64, 20 RPM (cp) | Bostwick (15 seconds)- Initial | Bostwick (15 seconds)- 24 hours |
| --- | --- | --- | --- | --- |
| Control (Reduced Fat, 17.5% Oil) | 10948 | 18167 | 7.0 | 5.5 |
| First soluble tapioca composition | 16875 | 27025 | 5.0 | 3.0 |
| Second soluble tapioca composition (filtered) | 9988 | 14390 | 8.5 | 6.5 |

Professional sensory analysis was also carried out. Each panelist was served about 2 oz of sample in 2 oz serving cups. Panelists were instructed to cleanse their palate with water in between samples. Comparison questionnaires aimed at comparing characteristics and attributes of the test samples compared to salad dressings containing control 10 DE maltodextrin were completed. Mean comparison score were calculated, and are presented in Table 5, again showing the soluble tapioca flour compositions described herein are a suitable replacement for maltodextrin.

TABLE 4

| Characteristics & Attributes | Control (maltodextrin) | First soluble tapioca flour composition | Second soluble tapioca flour composition (filtered) |
|---|---|---|---|
| Appearance & color | 5 | 3.25 | 4.5 |
| Overall aroma | 5 | 5 | 5 |
| Overall taste | 5 | 4 | 5 |
| Overall texture | 4.8 | 4 | 4.5 |
| Off-flavor | 5 | 4.5 | 4.5 |
| Overall flavor | 5 | 4 | 3.8 |
| Overall likeness | 5 | 4 | 4.5 |

TABLE 1

*DE (Dextrose Equivalent) was determined by Iodine-KI method.

| Sample Label | Sample Details | CHO | Protein | Fat | Soluble Fiber | Insoluble fiber | Sugar | Galactose |
|---|---|---|---|---|---|---|---|---|
| King Lion Flour | King Lion Cassava Flour | 88.50% | 0.88% | <0.5% | 2.90% | 6.20% | 1.19% | <0.1% |
| Soluble Tapioca Flour (intermediate) | Tapioca flour hydrolyzed by α-amylase | 94.70% | 0.82% | <0.5% | 2.20% | 3.00% | 3.32% | <0.1% |
| First soluble tapioca flour composition | Tapioca flour hydrolyzed by α-amylase & Viscozyme L | 93.50% | 1.07% | <0.5% | 0.30% | 2.40% | 9.45% | <0.1% |
| Second soluble tapioca flour composition | Tapioca flour hydrolyzed by α-amylase, Viscozyme L & Filtered | 96.70% | <0.781 | <0.5% | <0.2% | 0.60% | 8.41% | <0.1% |

| Sample Label | Fructose | Glucose | Sucrose | Maltose | Lactose | Ash | Moisture | DE (Iodine-KI Method) |
|---|---|---|---|---|---|---|---|---|
| King Lion Flour | 0.11% | 0.20% | 0.89% | 0.89% | <0.1% | 0.72% | 9.93% | |
| Soluble Tapioca Flour (intermediate) | 0.39% | 0.70% | 0.54% | 1.70% | <0.1% | 0.87% | 3.60% | 13 |
| First soluble tapioca flour composition | 0.45% | 5.91% | 0.30% | 2.79% | <0.1% | 1.29% | 4.17% | 13 |
| Second soluble tapioca flour composition | 0.52% | 5.01% | 0.27% | 2.61% | <0.1% | 1.02% | 2.29% | 13 |

The invention claimed is:

1. A soluble tapioca flour composition comprising:
   a carbohydrate content ranging from 90 to 98 wt % based on total weight of the composition,
   a protein content ranging from 0.5 to 1.5 wt % based on total weight of the composition,
   a fat content of less than 1 wt % based on total weight of the composition, and
   an insoluble fiber content ranging from 0.5 to 3.5 wt % based on total weight of the composition;
   wherein:
      the soluble tapioca flour composition is an enzyme treated soluble tapioca flour; and
      the soluble tapioca flour composition comprises a particle size distribution after solubilization in 90° C. water wherein 90% of particles have a size of 350 microns or less, 50% of particles have a particle size of 150 microns or less, and 10% of particles have a particle size of 40 microns or less based on wet/dispersed solubility in 90° C. water.

2. The composition of claim 1, wherein the insoluble fiber content ranges from 0.5 to 1 wt % based on total weight of the composition.

3. The composition of claim 1, having a dextrose equivalent ranging from 5 to 18.

4. The composition of claim 3, having a dextrose equivalent ranging from 8 to 15.

5. The composition of claim 1, wherein the composition is filtered.

6. The composition of claim 1, having a viscosity ranging from 1 to 10 cP at 25 C and 10% dry solids.

7. A food product, comprising the soluble tapioca flour composition of claim 1.

8. The food product of claim 7, being a beverage mix, infant food, a medicinal product, an emulsion, convenience foods, salad dressings, or a snack-based filling.

9. The food product of claim 7, wherein the soluble tapioca flour composition is at least a partial replacement or full replacement of maltodextrin.

10. The composition of claim 1, wherein 100% of particles have a particle size of less than 1 micron.

11. The composition of claim 1, wherein the composition is substantially soluble in water.

* * * * *